(12) United States Patent
Liu et al.

(10) Patent No.: US 12,104,102 B2
(45) Date of Patent: Oct. 1, 2024

(54) AQUEOUS-BASED RELEASE COATING COMPOSITIONS

(71) Applicants: Dow Global Technologies LLC, Midland, MI (US); Rohm and Haas Company, Collegeville, PA (US); Dow Silicones Corporation, Midland, MI (US)

(72) Inventors: Fang Liu, Shanghai (CN); Xinhong Wang, Shanghai (CN); Li Ding, Shanghai (CN); Zhihua Liu, Shanghai (CN); Zhaohui Qu, Shanghai (CN)

(73) Assignees: Dow Global Technologies LLC, Midland, MI (US); Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 1070 days.

(21) Appl. No.: 16/976,405

(22) PCT Filed: Feb. 28, 2018

(86) PCT No.: PCT/CN2018/077513
§ 371 (c)(1),
(2) Date: Aug. 27, 2020

(87) PCT Pub. No.: WO2019/165592
PCT Pub. Date: Sep. 6, 2019

(65) Prior Publication Data
US 2020/0407603 A1 Dec. 31, 2020

(51) Int. Cl.
C09J 7/40 (2018.01)
C09D 131/04 (2006.01)
C09D 133/04 (2006.01)

(52) U.S. Cl.
CPC ............ *C09J 7/401* (2018.01); *C09D 131/04* (2013.01); *C09D 133/04* (2013.01); *C08L 2201/52* (2013.01); *C09J 2203/334* (2013.01); *C09J 2301/414* (2020.08); *C09J 2431/005* (2013.01); *C09J 2467/005* (2013.01); *C09J 2483/005* (2013.01)

(58) Field of Classification Search
None
See application file for complete search history.

(56) References Cited

U.S. PATENT DOCUMENTS

| 2,876,895 | A | * | 3/1959 | Port ........................ C09J 7/21 |
| | | | | 526/330 |
| 2,930,775 | A | * | 3/1960 | Fordyce ................ C08K 3/013 |
| | | | | 525/218 |
| 3,933,702 | A | | 1/1976 | Caimi et al. |
| 4,029,843 | A | * | 6/1977 | Shah ........................ C09J 7/22 |
| | | | | 428/509 |
| 4,066,594 | A | | 1/1978 | Moeller |
| 5,413,815 | A | | 5/1995 | Williams et al. |
| 5,548,017 | A | | 8/1996 | DiStefano |
| 6,344,520 | B1 | * | 2/2002 | Greene ................ C09D 183/06 |
| | | | | 524/588 |
| 6,541,109 | B1 | | 4/2003 | Kumar et al. |
| 8,067,066 | B2 | | 11/2011 | Scholten et al. |
| 8,663,743 | B2 | * | 3/2014 | Vonfelden ................ C09J 7/401 |
| | | | | 427/391 |
| 2007/0059539 | A1 | | 3/2007 | Doehler et al. |
| 2014/0308516 | A1 | | 10/2014 | Yonezaki et al. |

FOREIGN PATENT DOCUMENTS

| CN | 86100983 | | 11/1986 | |
| CN | 100437672 | C * | 11/2008 | ............... B64B 1/02 |
| CN | 100537672 | C * | 9/2009 | ........... C09D 183/06 |
| EP | 0189978 | | 8/1986 | |
| EP | 1772479 | A1 * | 4/2007 | ............... B05D 5/08 |
| JP | S52-075677 | A | 6/1977 | |
| JP | S61-18457 | A | 7/1984 | |
| JP | 05311142 | A * | 11/1993 | |
| JP | 3669609 | B2 * | 7/2005 | |
| JP | 2008542462 | A | 11/2008 | |
| JP | 2016074865 | A | 5/2016 | |
| JP | 2016196609 | A | 11/2016 | |

(Continued)

OTHER PUBLICATIONS

Machine translation of JP 3669609 B2, retrieved Aug. 2023 (Year: 2023).*

(Continued)

*Primary Examiner* — Nicole M. Buie-Hatcher
(74) *Attorney, Agent, or Firm* — Boyle Fredrickson, S.C.

(57) ABSTRACT

Aqueous-based release coating compositions are disclosed. The disclosed aqueous-based release coating compositions are particularly suitable for use with pressure sensitive adhesives. In some embodiments, the aqueous-based release coating compositions include (A) a vinyl-based emulsion copolymer comprising a copolymerizable acid monomer, (B) a silicone-based emulsion comprising a mixture of amine-, polyol-functional siloxane and epoxy-, glycol-functional siloxane, and (C) a polymeric dispersant comprising an acid functional group. In some embodiments, the weight ratio of silicone-based emulsion (B) to polymeric dispersant (C) in the aqueous-based release coating compositions is from 2:1 to 3:1. The disclosed release coating compositions are suitable for use in, inter alia, tape applications.

12 Claims, No Drawings

(56) References Cited

FOREIGN PATENT DOCUMENTS

| | | | |
|---|---|---|---|
| JP | 2017057257 | A | 3/2017 |
| JP | 2017177413 | A | 10/2017 |
| TW | 201546185 | A * | 12/2015 |
| WO | 2004085561 | A3 | 1/2005 |
| WO | 2016046379 | | 3/2016 |

OTHER PUBLICATIONS

Machine translation of TW 201546185 A, retrieved Aug. 2023 (Year: 2023).*
Machine translation of CN 100437672 C, retrieved Aug. 2023 (Year: 2023).*
Machine translation of CN 100537672 C, retrieved Aug. 2023 (Year: 2023).*
Feng Yaqing et al., Auxiliary Chemistry and Technology, 1997, p. 10.
PCT/CN2018/077513; International Search Report and Written Opinion of the International Searching Authority with a mailing date of Nov. 28, 2018.

* cited by examiner

AQUEOUS-BASED RELEASE COATING COMPOSITIONS

FIELD OF THE DISCLOSURE

The instant disclosure relates to aqueous-based release coating compositions for use with pressure sensitive adhesives. The disclosed aqueous-based release coating compositions comprise (A) a vinyl-based emulsion copolymer comprising a copolymerizable acid monomer, (B) a silicone-based emulsion comprising a mixture of amine-, polyol-functional siloxane and epoxy-, glycol-functional siloxane, and (C) a polymeric dispersant comprising an acid functional group. In some embodiments, the weight ratio of silicone-based emulsion (B) to polymeric dispersant (C) in the aqueous-based release coating compositions is from 2:1 to 3:1.

The disclosed aqueous-based release coating compositions are particularly useful in label and/or tape applications comprising a pressure sensitive adhesive layer where migration of silicone from the release coating into the adhesive layer is a concern. The disclosed release coating compositions provide for relatively-low release force at least in part because of the presence of siloxane and provide for low migration because of the anchoring effect by chemical and physical interaction among the vinyl-based emulsion copolymer comprising a copolymerizable acid monomer, the silicone-based emulsion having amino and epoxy functionality, and the dispersant comprising an acid functional group.

BACKGROUND AND SUMMARY OF THE DISCLOSURE

As is known in the art, the use of pressure sensitive adhesives often calls for the use of a release coating composition. For tapes and related applications, the release coating composition is applied to the side opposite that to which the adhesive layer is affixed. For labels and related applications, the release coating composition is applied to that side of the protective cover sheet which comes in contact with the adhesive layer.

Conventional release coating compositions are usually film forming substances or solutions essentially comprised of a solvent, a release agent, and, at times, one or more optional additives. Among the more common conventional release coating compositions are those essentially comprised of a thermosetting silicone resin dissolved in an organic solvent, e.g., toluene, xylene. Release coating compositions of this type have proven quite useful in providing for the rapid release of cover sheets of labels and the like and, for the easy unwinding of tapes and other adhesive bearing articles in rolled form. However, they often present problems such as the transfer or migration of the silicone into the adhesive layer. This undesired occurrence of silicone migration, which usually happens during storage of the coated product, is especially evidenced by a significant decrease in adhesive strength, due to the contamination of the adhesive layer.

Accordingly, release coating compositions for use with pressure sensitive adhesives exhibiting decreased silicone migration into the adhesive layer are desirable.

Aqueous-based release coating compositions are disclosed. The disclosed aqueous-based release coating compositions are particularly suitable for use with pressure sensitive adhesives. In some embodiments, the aqueous-based release coating compositions include (A) a vinyl-based emulsion copolymer comprising a copolymerizable acid monomer, (B) a silicone-based emulsion comprising a mixture of amine-, polyol-functional siloxane and epoxy-, glycol-functional siloxane, and (C) a polymeric dispersant comprising an acid functional group. In some embodiments, the weight ratio of silicone-based emulsion (B) to polymeric dispersant (C) in the aqueous-based release coating compositions is from 2:1 to 3:1. The disclosed release coating compositions are suitable for use in, inter alia, masking tape applications.

DETAILED DESCRIPTION OF THE DISCLOSURE

In some embodiments, the aqueous-based release coating compositions include (A) a vinyl-based emulsion copolymer comprising a copolymerizable acid monomer, (B) a silicone-based emulsion comprising a mixture of amine-, polyol-functional siloxane and epoxy-, glycol-functional siloxane, and (C) a polymeric dispersant comprising an acid functional group. In some embodiments, the weight ratio of silicone-based emulsion (B) to polymeric dispersant (C) in the aqueous-based release coating compositions is from 2:1 to 3:1.

(A) Vinyl-Based Emulsion Copolymer

The methods for polymerizing the vinyl-based emulsion copolymer (A) are known to those skilled in the art.

In some embodiments, the vinyl-based emulsion copolymer comprising a copolymerizable acid monomer (A) comprises from 0.5 to 5 percent by weight of copolymerizable acid monomers derived from alpha-unsaturated mono-or-dicarboxylic acids. Suitable monocarboxylic acids include, but are not limited to, acrylic acid, methacrylic acid, vinyl benzoic acid, 2-butenoic acid, and combinations thereof. Suitable dicarboxylic acids include, but are not limited to, maleic acid, fumaric acid, itaconic acid, their anhydride, and combinations thereof.

In some embodiments, the remainder of the vinyl-based emulsion copolymer (A) are non-functional copolymerizable monomers capable of copolymerizing with the copolymerizable acid monomer including, but not limited to, vinyl acetate, vinyl chloride, vinylidene chloride, styrene and alkyl (meth)acrylates, wherein the alkyl group contains from 2 to 10 carbon atoms, and combinations thereof.

The vinyl-based emulsion copolymer (A) should be capable of forming a film when dried. In some embodiments, the emulsion copolymer (A) will have a Tg in the range of 0 to 60° C.

The amount of the vinyl-based emulsion copolymer comprising a copolymerizable acid monomer (A) in the release coating composition is from 80 to 99 weight percent, or from 92 to 97 weight percent, based on the total dry weight of the release coating composition.

(B) Silicone-Based Emulsion

In some embodiments, the silicone-based emulsion (B) comprises a mixture of (a) an amine-, polyol-functional siloxane and (b) an epoxy-, glycol-functional siloxane. In some embodiments, the amine-, polyol-functional siloxane (a) has the general formula:

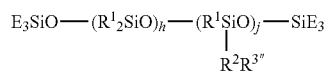

wherein each E is independently selected from the group consisting of a monovalent hydrocarbon group, a hydroxyl group, and an alkoxy group; each R1 is independently a monovalent hydrocarbon group; each R2 is independently a divalent hydrocarbon group having 1 to 10 carbon atoms; h is 25 to 1,000; j is 0.1 to 200; and each R3" is a heterocyclic nitrogen-containing compound including

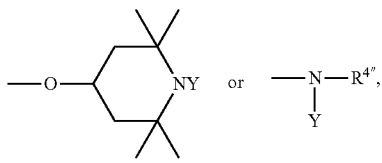

wherein each R4" is independently selected from the group consisting of a hydrogen atom and a group of formula —R2NY2, each Y is independently a hydrogen atom or Y', and each Y' is a group of formula

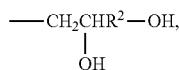

wherein R2 groups are independently characterized as above, and the proviso that every Y is not H.

In some embodiments, the epoxy-, glycol-siloxane (b) has the general formula:

wherein each R1 is independently a monovalent hydrocarbon group, R6 is an epoxy containing group, R7 is a polyether group, each E is independently selected from the group consisting of a monovalent hydrocarbon group, a hydroxyl group, and an alkoxy group, h is 25 to 1000, j is 0.1 to 200, and k is 0.1 to 200.

In some embodiments, the silicone-based emulsion (B) may further comprise one or more surfactants (c) selected from the group consisting of nonionic surfactants. The amount of ingredient (c) is about 3 to 25 weight percent based on the total dry weight of the silicone-based emulsion (B).

In some embodiments, the silicone-based emulsion (B) may further comprise optional ingredient (d), an organic acid. In some embodiments, optional ingredient (d) is a glacial acetic acid. The amount of ingredient (d) in the silicon-based emulsion (B) typically ranges from 0 to 2 weight percent based on the total dry weight of the silicon-based emulsion (B).

The amount of the silicone-based emulsion (B) in the release coating composition is from 0.5 to 8 weight percent, or from 2 to 5 weight percent, based on the total dry weight of the release coating composition.

(C) Polymeric Dispersant

In some embodiments, the aqueous-based release coating compositions comprise a polymeric dispersant (C) comprising an acid functional group.

In some embodiments, the polymeric dispersant (C) comprising an acid functional group comprises copolymerizable acid monomers derived from alpha-unsaturated mono-or- dicarboxylic acids. Suitable monocarboxylic acids include, but are not limited to, acrylic acid, methacrylic acid, 2-bute- noic acid, and combinations thereof. Suitable dicarboxylic acids include, but are not limited to, maleic acid, fumaric acid, itaconic acid, their anhydride, and combinations thereof. Preferably, the copolymerizable acid monomer is maleic anhydride.

In some embodiments, the polymeric dispersant (C) comprising an acid functional group is a sodium salt of a carboxylate polycarboxylic acid copolymer.

In some embodiments, the polymeric dispersant (C) comprising an acid functional group further comprises hydrophobic monomers. Suitable hydrophobic monomers includes, but are not limited to, styrene, alpha-methyl styrene, diisobutylene, and combination thereof.

In some embodiments, the polymeric dispersant (C) comprising an acid functional group is a sodium salt of maleic anhydride, diisobutylene copolymer.

The amount of the polymeric dispersant (C) comprising an acid functional group in the release coating composition is from 0.5 to 5 weight percent, or from 0.75 to 2 weight percent, based on the total dry weight of the release coating composition.

(D) Additives

In some embodiments, the aqueous-based release coating compositions further comprise an additive (D). Suitable additives (D) for use according to this disclosure include, but are not limited to, a crosslinker, a defoamer, a flow and leveling agent, a colorant, a rheology modifier, a film forming agent, a biocide/anti-fungal agent, an antioxidant, a surfactant/emulsifier, and combinations thereof.

After the emulsion copolymer (A) has been prepared, the silicone-based emulsion (B), dispersant (C) and optional additive (D) are then added thereto mixed until the solution is homogeneous. While this is the preferred method of preparing the disclosed release coating compositions, other methods known in the art may be suitable including that of adding the silicone-based emulsion (B) before or during the polymerization of the components making up the emulsion copolymer (A) in accordance with methods known in the art.

Examples of the Disclosure

The present disclosure will now be explained in further detail by describing examples illustrating the disclosed adhesive compositions and existing adhesive compositions (Illustrative Examples "IE", Comparative Examples "CE", collectively, "the Examples"). However, the scope of the present disclosure is not, of course, limited to the Examples.

The Examples are prepared using the raw materials identified in Table 1.

| Reference | Description |
| --- | --- |
| "A" | Polyvinyl acetate copolymer emulsion; ~46.5% solids |
| "B" | Silicon-based emulsion; ~20% solids |
| "C" | Polymeric Dispersant; 25% solids |
| SUNCRYL ™ CR 223B | Vinyl acrylic copolymer-based release coating; ~41% solids, available from Omnova Solutions |

Preparation of Polyvinyl Acetate Copolymer Emulsion "A"

In a typical emulsion polymerization, polyvinyl acetate copolymer is synthesized with following composition: 0.5% acrylic acid, 0.25% maleic anhydride, 3% butyl acrylate and 96.25 vinyl acetate based on dry weight of total monomers. The emulsion solid content is 46.5% and pH is around 7.

Preparation of Silicone-Based Emulsion "B"

94 parts of polymer (i) was mixed with 6 parts of 8421 fluid (epoxy-, glycol silicone, supplied by Dow Corning) to get a homogeneous mixture.

polymer (i)

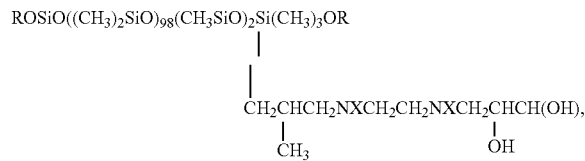

where 75% of all instances of X have formula

and 25% of X is hydrogen.

Then 10 parts of SOFTANOL™ 90 and 10 parts of SOFTANOL™ 160 (available from Nippon Shokubai Co., LTD) are added into the mixture and mixed well. 100 parts of water is added at high shear speed to get a thick phase emulsion followed by dilution with 179 parts of water step by step. Finally, 1 part of acetic acid and 0.4 parts of KATHON™ LX (supplied by The Dow Chemical Company) are added as biocide.

Preparation of Polymeric Dispersant "C"

The polymeric dispersant is a maleic anhydride, diisobutylene alternating copolymer with acid content of 50%. The product is synthesized as a solution polymer in xylene, and is neutralized with sodium hydroxide. The water soluble sodium salt is separated from the organic solvent with an aqueous extraction and is used as an aqueous dispersant at 25% weight solids.

The Examples are formulated according to the formulations identified in Table 2.

TABLE 2

| | \multicolumn{6}{c}{Example Formulations} | | | | | |
|---|---|---|---|---|---|---|
| | CE1 | IE2 | CE3 | CE4 | CE5 | CE6 |
| A | 90 | 90 | 90 | 90 | 90 | |
| BB | 8 | 8 | 5 | 12 | 8 | |

TABLE 2-continued

| | \multicolumn{6}{c}{Example Formulations} | | | | | |
|---|---|---|---|---|---|---|
| | CE1 | IE2 | CE3 | CE4 | CE5 | CE6 |
| C | | 3 | | 3 | 1 | |
| SUNCRYL™ CR 223B | | | | | | 100 |
| Total (parts by weight) | 98 | 101 | 95 | 105 | 99 | 100 |

The tests are conducted as follows: the compositions are each applied the rough side of crepe paper stock with an 0 #Meyer Rod and the compositions can be diluted to ensure the dry coating weight is about 5 gsm. The wet web is dried for 15 seconds at 130° C. in a circulated oven.

The testing tape is 3M™ 2310 supplied by 3M company or ROBOND™ PS-2008 supplied by The Dow Chemical Company. The aged conditions of tape with release backing are 3 days at 23° C./55% or aged 3 days at 70° C. with a pressure of 6.86 kpa (70 g/cm²).

The initial adhesion to stainless steel is measured by Federation Internationale des fabricants et transformateurs d'Adhésifs et Thermocollants ("FINAT") Test Method No. 1.

The unwinding adhesion properties of the dried compositions are measured by FINAT Test Method No. 3 (low speed unwinding adhesion=300 mm/min) and FINAT Test Method No. 4 (high speed unwinding adhesion=1524 mm/min, peel angle changed to 90 degree).

The re-adhesion (peel retention) is tested according to FINAT Test Method No. 1 for the used tape after contacted with release backing and aged 3 days at 23° C./55% and 3 days at 70° C. The test substrate is stainless steel.

Performance results for the Examples are detailed in Tables 3 and 4. Table 3 details performance results run with solvent-based pressure sensitive adhesives while Table 4 details results for water-based pressure sensitive adhesives. With all Examples, moderate release force and relatively-higher peel retention are desirable.

TABLE 3

Performance results with solvent nature rubber-based PSA 3M™ 2310

| | Release force, Aged 3 days@ 23 C., RH55%, | | Peel Retention, N/inch on Stainless Steel | Release force, Aged 3 days @ 70 C. | | Peel Retention, N/inch on Stainless Steel |
|---|---|---|---|---|---|---|
| Testing Samples | Low Speed, N/inch | High Speed, N/inch | Aged 3 days @ 23 C., RH55% FTM1 | Low Speed, N/inch | High Speed, N/inch | Aged 3 days @ 70 C. FTM1 |
| CE1 | 2.3A | 3.3A | 5.0A | 3.6A | 6.0A | 4.5A |
| CE3 | 4.0A | 8.8A | 5.0A | 5.8A | 11.1A | 4.9A |
| CE4 | 2.4A | 3.2A | 5.0A | 2.5A | 5.7A | 4.6A |
| CE5 | 3.4A | 6.5A | 5.0A | 4.3A | 8.0A | 4.4A |
| IE2 | 2.9A | 3.5A | 5.2A | 4.0A | 7.5A | 5.1A |

TABLE 3

| | Release force, Aged 3 days @ 23 C., RH55%, | | Peel Retention, N/inch on Stainless Steel | Release force, Aged 3 days @ 70 C. | | Peel Retention, N/inch on Stainless Steel |
|---|---|---|---|---|---|---|
| Testing Samples | Low Speed, N/inch | High Speed, N/inch | Aged 3 days @ 23 C., RH55% FTM1 | Low Speed, N/inch | High Speed, N/inch | Aged 3 days @ 70 C. FTM1 |
| CE1 | 2.1A | 4.2A | 4.8A | 5.4A | 7.9A | 4.4A |
| IE2 | 2.2A | 4.5A | 4.7A | 5.6A | 8.3A | 5.1A |
| CE6 | 1.6A | 3.6A | 4.7A | 5.5A | 9.3A | 4.2A |

In addition to the embodiments described above, many embodiments of specific combinations are within the scope of the disclosure, some of which are described below:

Embodiment 1. An aqueous-based release coating composition, comprising:
(A) a vinyl-based emulsion copolymer comprising a copolymerizable acid monomer;
(B) a silicone-based emulsion comprising a mixture of amine-, polyol-functional siloxane and epoxy-, glycol-functional siloxane; and
(C) a polymeric dispersant comprising an acid functional group, wherein the weight ratio of silicone-based emulsion (B) to polymeric dispersant (C) in the aqueous-based release coating compositions is from 2:1 to 3:1.

Embodiment 2. The aqueous-based release coating composition according to any preceding or succeeding Embodiment, wherein the vinyl-based emulsion copolymer (A) comprises from 0.5 to 5 weight percent of copolymerizable acid monomer derived from an alpha-unsaturated mono-or-dicarboxylic acid.

Embodiment 3. The aqueous-based release coating composition according to any preceding or succeeding Embodiment, wherein the vinyl-based emulsion copolymer (A) is present from 80 to 99 weight percent, based on the total dry weight of the release coating composition.

Embodiment 4. The aqueous-based release coating composition according to any preceding or succeeding Embodiment, wherein the vinyl-based emulsion copolymer (A) is present from 88 to 92 weight percent, based on the total dry weight of the release coating composition.

Embodiment 5. The aqueous-based release coating composition according to any preceding or succeeding Embodiment, wherein the vinyl-based emulsion copolymer (A) comprises a copolymerizable monomer selected form the group consisting of a vinyl acetate monomer, a vinyl chloride monomer, a vinylidene chloride monomer, a styrene monomer, an alkyl acrylate monomer, and combinations thereof.

Embodiment 6. The aqueous-based release coating composition according to any preceding or succeeding Embodiment, wherein the vinyl-based emulsion copolymer (A) has a Tg of from 0 to 60° C.

Embodiment 7. The aqueous-based release coating composition according to any preceding or succeeding Embodiment, wherein the silicone-based emulsion (B) is present from 0.5 to 8 weight percent, based on the total dry weight of the release coating composition.

Embodiment 8. The aqueous-based release coating composition according to any preceding or succeeding Embodiment, wherein the silicone-based emulsion (B) is present from 2 to 5 weight percent, based on the total dry weight of the release coating composition.

Embodiment 9. The aqueous-based release coating composition according to any preceding or succeeding Embodiment, wherein the amine-, polyol-functional siloxane has the general formula,

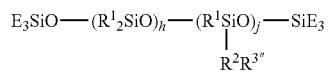

wherein each E is independently selected from the group consisting of a monovalent hydrocarbon group, a hydroxyl group, and an alkoxy group; each R1 is independently a monovalent hydrocarbon group; each R2 is independently a divalent hydrocarbon group having 1 to 10 carbon atoms; h is 25 to 1,000; j is 0.1 to 200; and each R3" is a heterocyclic nitrogen-containing compound including

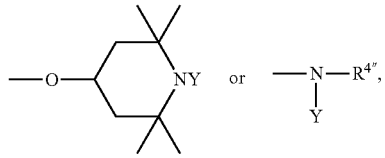

wherein each R4" is independently selected from the group consisting of a hydrogen atom and a group of formula —R2NY2, each Y is independently a hydrogen atom or Y', and each Y' is a group of formula

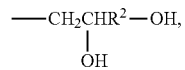

wherein R2 groups are independently characterized as above, and the proviso that every Y is not H.

Embodiment 10. The aqueous-based release coating composition according to any preceding or succeeding Embodiment, wherein the epoxy-, glycol-siloxane has the general formula:

wherein each R1 is independently a monovalent hydrocarbon group, R6 is an epoxy containing group, R7 is a polyether group, each E is independently selected from the group consisting of a monovalent hydrocarbon group, a hydroxyl group, and an alkoxy group, h is 25 to 1000, j is 0.1 to 200, and k is 0.1 to 200.

Embodiment 11. The aqueous-based release coating composition according to any preceding or succeeding Embodiment, wherein the silicone-based emulsion (B) further comprises a surfactant.

Embodiment 12. The aqueous-based release coating composition according to any preceding or succeeding Embodiment, wherein the silicone-based emulsion (B) further comprises an organic acid, such as glacial acetic acid.

Embodiment 13. The aqueous-based release coating composition according to any preceding or succeeding Embodiment, wherein the polymeric dispersant (C) is present from 0.5 to 5 weight percent, based on the total dry weight of the release coating composition.

Embodiment 14. The aqueous-based release coating composition according to any preceding or succeeding Embodiment, wherein the polymeric dispersant (C) is present from 0.75 to 2 weight percent, based on the total dry weight of the release coating composition.

Embodiment 15. The aqueous-based release coating composition according to any preceding or succeeding Embodiment, wherein the polymeric dispersant (C) comprises copolymerizable acid monomers derived from alpha-unsaturated mono-or-dicarboxylic acids.

Embodiment 16. The aqueous-based release coating composition according to any preceding or succeeding Embodiment, wherein the polymeric dispersant (C) comprises a sodium salt of a carboxylate polycarboxylic acid copolymer.

Embodiment 17. The aqueous-based release coating composition according to any preceding or succeeding Embodiment, wherein the polymeric dispersant (C) comprises a hydrophobic monomer.

Embodiment 18. The aqueous-based release coating composition according to any preceding or succeeding Embodiment, wherein the polymeric dispersant (C) comprises a sodium salt of maleic anhydride, diisobutylene copolymer.

Embodiment 19. The aqueous-based release coating composition according to any preceding or succeeding claim, further comprising an additive (D) selected from the group consisting of a crosslinker, a defoamer, a flow and leveling agent, a colorant, a rheology modifier, a film forming agent, a biocide/anti-fungal agent, an antioxidant, a surfactant/emulsifier, and combinations thereof.

Embodiment 20. An aqueous-based release coating composition, comprising:
(A) an emulsion copolymer comprising a vinyl acetate monomer unit and an acid monomer unit derived from alpha-unsaturated mono-or-dicarboxylic acid;
(B) a silicone-based emulsion comprising a mixture of amine-, polyol-functional siloxane and epoxy-, glycol-functional siloxane; and
(C) a polymeric dispersant comprising an acid functional group, wherein the weight ratio of silicone-based emulsion (B) to polymeric dispersant (C) in the aqueous-based release coating compositions is from 2:1 to 3:1.

Embodiment 21. A label or tape comprising the aqueous-based release coating composition according to any preceding or succeeding Embodiment.

What is claimed is:

1. An aqueous-based release coating composition, comprising:
(A) a vinyl-based emulsion copolymer comprising a copolymerizable acid monomer comprising maleic anhydride;
(B) from 0.5 wt % to 8 wt % of a silicone-based emulsion comprising a mixture of amine-, polyol-functional siloxane and epoxy-, glycol-functional siloxane, based on the total dry weight of the release coating composition; and
(C) a polymeric dispersant comprising an acid functional group comprising maleic anhydride or a sodium salt thereof,
wherein the dry weight ratio of silicone-based emulsion (B) to polymeric dispersant (C) in the aqueous-based release coating composition is from 2:1 to 3:1.

2. The aqueous-based release coating composition according to claim 1, wherein the vinyl-based emulsion copolymer (A) comprises from 0.5 to 5 weight percent of copolymerizable acid monomer derived from an alpha-unsaturated mono-or-dicarboxylic acid.

3. The aqueous-based release coating composition according to claim 1, wherein the vinyl-based emulsion copolymer (A) is present from 80 to 99 weight percent, based on the total dry weight of the release coating composition.

4. The aqueous-based release coating composition according to claim 1, wherein the vinyl-based emulsion copolymer (A) comprises a copolymerizable monomer selected form the group consisting of a vinyl acetate monomer, a vinyl chloride monomer, a vinylidene chloride monomer, a styrene monomer, an alkyl acrylate monomer, and combinations thereof.

5. The aqueous-based release coating composition according to claim 1, wherein the amine-, polyol-functional siloxane has the general formula

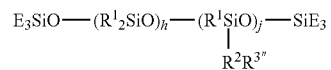

wherein each E is independently selected from the group consisting of a monovalent hydrocarbon group, a hydroxyl group, and an alkoxy group; each $R^1$ is independently a monovalent hydrocarbon group; each $R^2$ is independently a divalent hydrocarbon group having 1 to 10 carbon atoms; h is 25 to 1,000; j is 0.1 to 200; and each $R^{3''}$ is a nitrogen-containing compound including

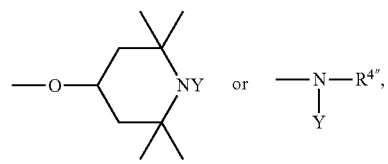

wherein each $R^{4''}$ independently selected from the group consisting of a hydrogen atom and a group of formula —R2NY2, each Y is independently a hydrogen atom or Y', and each Y' is a group of formula

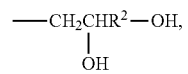

wherein $R^2$ groups are independently characterized as above, and the proviso that every Y is not H.

6. The aqueous-based release coating composition according to claim 1, wherein the epoxy-, glycol-siloxane has the general formula:

wherein each R1 is independently a monovalent hydrocarbon group, R6 is an epoxy containing group, R7 is a polyether group, each E is independently selected from the group consisting of a monovalent hydrocarbon group, a hydroxyl group, and an alkoxy group, h is 25 to 1000, j is 0.1 to 200, and k is 0.1 to 200.

7. The aqueous-based release coating composition according to claim 1, wherein the polymeric dispersant (C) is present from 0.5 to 5 weight percent, based on the total dry weight of the release coating composition.

8. The aqueous-based release coating composition according to claim 1, further comprising an additive (D) selected from the group consisting of a crosslinker, a defoamer, a flow and leveling agent, a colorant, a rheology modifier, a film forming agent, a biocide/anti-fungal agent, an antioxidant, a surfactant/emulsifier, and combinations thereof.

9. A label or tape comprising the aqueous-based release coating composition according to claim 1.

10. The aqueous-based release coating composition according to claim 1 wherein the maleic anhydride in (C) the polymeric dispersant comprises a sodium salt of maleic anhydride, diisobutylene copolymer.

11. An aqueous-based release coating composition, comprising:
  (A) an emulsion copolymer comprising a vinyl acetate monomer unit and an acid monomer unit derived from alpha-unsaturated mono-or-dicarboxylic acid and comprising maleic anhydride;
  (B) a silicone-based emulsion comprising a mixture of amine-, polyol-functional siloxane and epoxy-, glycol-functional siloxane; and
  (C) a polymeric dispersant comprising an acid functional group comprising maleic anhydride,
  wherein the weight ratio of silicone-based emulsion (B) to polymeric dispersant (C) in the aqueous-based release coating composition is from 2:1 to 3:1.

12. An aqueous-based release coating composition, comprising:
  (A) a vinyl-based emulsion copolymer comprising a copolymerizable acid monomer comprising acrylic acid, maleic anhydride, butyl acrylate, and vinyl acetate;
  (B) from 0.5 wt % to 8 wt % of a silicone-based emulsion comprising a mixture of amine-, polyol-functional siloxane and epoxy-, glycol-functional siloxane based on the total dry weight of the release coating composition; and
  (C) a polymeric dispersant comprising an acid functional group comprising maleic anhydride,
  wherein the dry weight ratio of silicone-based emulsion (B) to polymeric dispersant (C) in the aqueous-based release coating composition is from 2:1 to 3:1.

* * * * *